US008831976B2

(12) United States Patent
Sprogoe et al.

(10) Patent No.: US 8,831,976 B2
(45) Date of Patent: Sep. 9, 2014

(54) SYSTEM AND METHOD FOR TRANSACTING PURCHASES WITH A CASH VENDOR USING POINTS AND A VIRTUAL CREDIT CARD

(75) Inventors: Sven Sprogoe, Fenton, MO (US); Richard M. Philipak, Fenton, MO (US); Jeffrey D. Wagner, Chesterfield, MO (US)

(73) Assignee: Maritz Holdings Inc., Fenton, MO (US)

( * ) Notice: Subject to any disclaimer, the term of this patent is extended or adjusted under 35 U.S.C. 154(b) by 781 days.

(21) Appl. No.: 12/358,052

(22) Filed: Jan. 22, 2009

(65) Prior Publication Data
US 2010/0185505 A1 Jul. 22, 2010

(51) Int. Cl.
*G06Q 30/00* (2012.01)
*G06Q 20/00* (2012.01)
*G06Q 40/00* (2012.01)
*G06Q 20/06* (2012.01)
*G06Q 30/02* (2012.01)
*G06Q 20/20* (2012.01)
*G06Q 20/22* (2012.01)
*G06Q 20/10* (2012.01)
*G06Q 20/34* (2012.01)

(52) U.S. Cl.
CPC ............... *G06Q 20/22* (2013.01); *G06Q 20/06* (2013.01); *G06Q 30/0226* (2013.01); *G06Q 30/0235* (2013.01); *G06Q 20/20* (2013.01); *G06Q 30/02* (2013.01); *G06Q 20/105* (2013.01); *G06Q 20/351* (2013.01)
USPC ........................ 705/14.27; 705/14.35; 705/41

(58) Field of Classification Search
CPC . G06Q 30/02; G06Q 30/0226; G06Q 30/235; G06Q 20/06; G06Q 20/105; G06Q 20/20; G06Q 20/22; G06Q 20/351
USPC ...................................... 705/14.27, 14.35, 41
See application file for complete search history.

(56) References Cited

U.S. PATENT DOCUMENTS

| | | |
|---|---|---|
| 5,287,268 A | 2/1994 | McCarthy |
| 5,483,444 A | 1/1996 | Heintzeman et al. |
| 5,734,838 A | 3/1998 | Robinson et al. |
| 5,806,045 A | 9/1998 | Biorge et al. |
| 5,937,391 A | 8/1999 | Ikeda et al. |
| 5,966,700 A | 10/1999 | Gould et al. |
| 6,009,412 A * | 12/1999 | Storey .................. 705/14.27 |
| 6,016,504 A | 1/2000 | Arnold et al. |
| 6,032,136 A | 2/2000 | Brake, Jr. et al. |
| 6,076,069 A | 6/2000 | Laor |
| 6,138,911 A | 10/2000 | Fredregill et al. |
| 6,148,330 A | 11/2000 | Puri et al. |

(Continued)

OTHER PUBLICATIONS

"Net 1 UEPS Technologies Inc. at Morgan Stanley Technology Conference—Final," Fair Disclosure Wier (Quarterly Earning Reports), Mar. 7, 2007.*

(Continued)

*Primary Examiner* — Kirsten Apple
*Assistant Examiner* — Joan Goodbody
(74) *Attorney, Agent, or Firm* — Senniger Powers LLP

(57) ABSTRACT

System and method that utilizes a participant's points and a single use, virtual credit card account to implement a cash purchase with a cash vendor. The virtual credit card is active for a single purchase only with an available credit equal to the total of the cash purchase price and any fees. The virtual credit card may further be active for a limited period of time.

6 Claims, 8 Drawing Sheets

(56) References Cited

U.S. PATENT DOCUMENTS

| | | |
|---|---|---|
| 6,199,762 B1 | 3/2001 | Hohle |
| 6,330,544 B1* | 12/2001 | Walker et al. ............ 705/14.36 |
| 6,336,098 B1 | 1/2002 | Fortenberry et al. |
| 6,598,028 B1 | 7/2003 | Sullivan et al. |
| 6,675,178 B1 | 1/2004 | Chinchar et al. |
| 6,819,340 B2 | 11/2004 | Burke |
| 7,134,087 B2* | 11/2006 | Bushold et al. ............... 715/764 |
| 2001/0037241 A1* | 11/2001 | Puri ............................. 705/14 |
| 2001/0037243 A1 | 11/2001 | Rouston et al. |
| 2001/0054003 A1* | 12/2001 | Chien et al. ................... 705/14 |
| 2001/0054010 A1 | 12/2001 | Bernabeo et al. |
| 2002/0007344 A1* | 1/2002 | Kikuchi ........................ 705/39 |
| 2002/0111859 A1 | 8/2002 | Sheldon et al. |
| 2002/0147678 A1 | 10/2002 | Drunsic |
| 2002/0156676 A1* | 10/2002 | Ahrens et al. .................. 705/14 |
| 2002/0186254 A1 | 12/2002 | Monbaron |
| 2002/0188509 A1* | 12/2002 | Ariff et al. ...................... 705/14 |
| 2003/0071841 A1 | 4/2003 | Laronge et al. |
| 2003/0189589 A1 | 10/2003 | LeBlanc et al. |
| 2003/0195842 A1* | 10/2003 | Reece ............................. 705/39 |
| 2004/0122736 A1* | 6/2004 | Strock et al. ................... 705/14 |
| 2004/0215505 A1* | 10/2004 | Sullivan ......................... 705/14 |
| 2006/0064372 A1* | 3/2006 | Gupta ............................ 705/39 |
| 2006/0111980 A1* | 5/2006 | Sullivan ......................... 705/14 |
| 2007/0083444 A1* | 4/2007 | Matthews et al. .............. 705/30 |

OTHER PUBLICATIONS

Chakravorti, S, "Theory of Credit Card Networks: A Survey of the Literature," Review of Network Economics, vol. 2, Issue 2, Jun. 2003.*

* cited by examiner

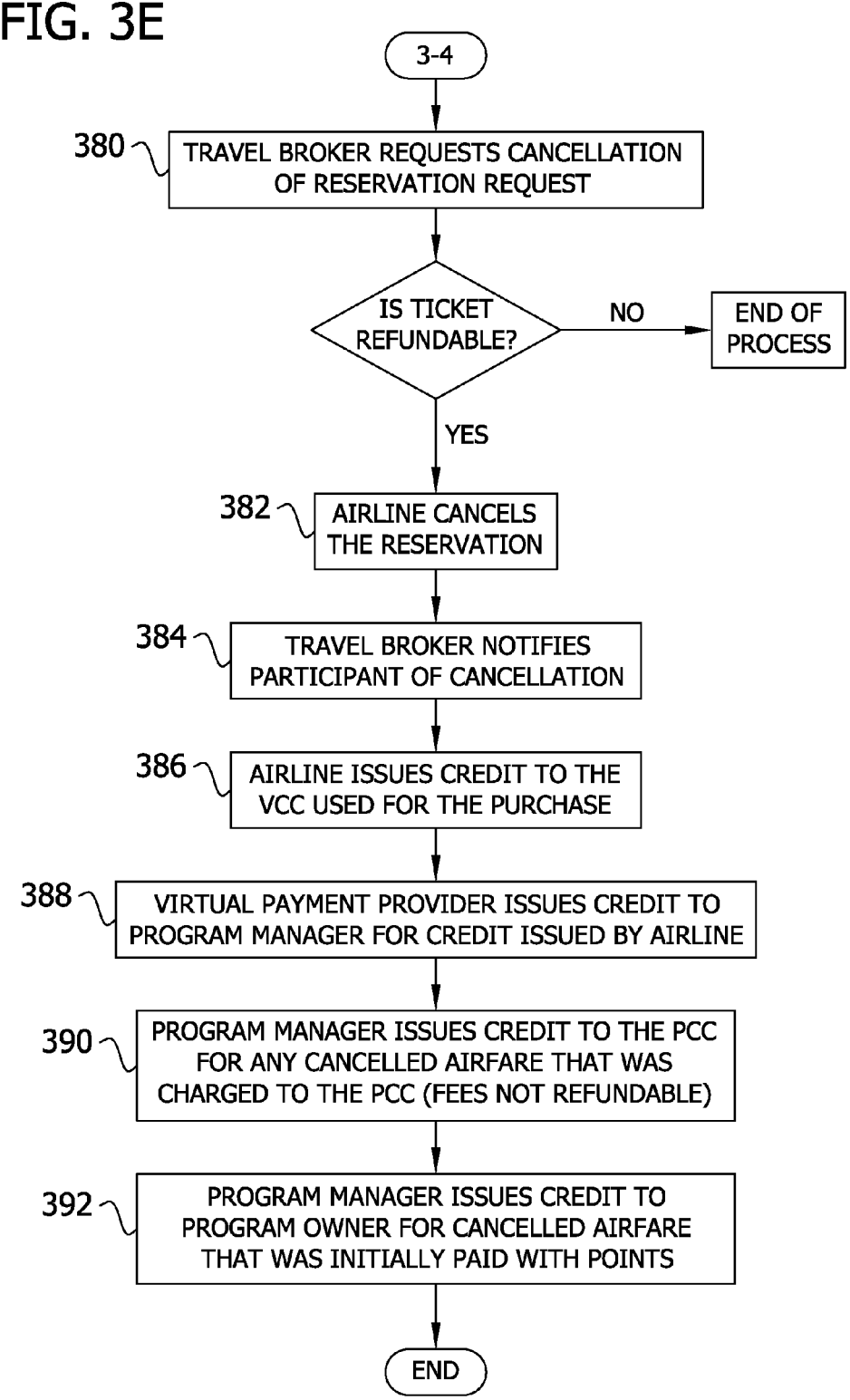

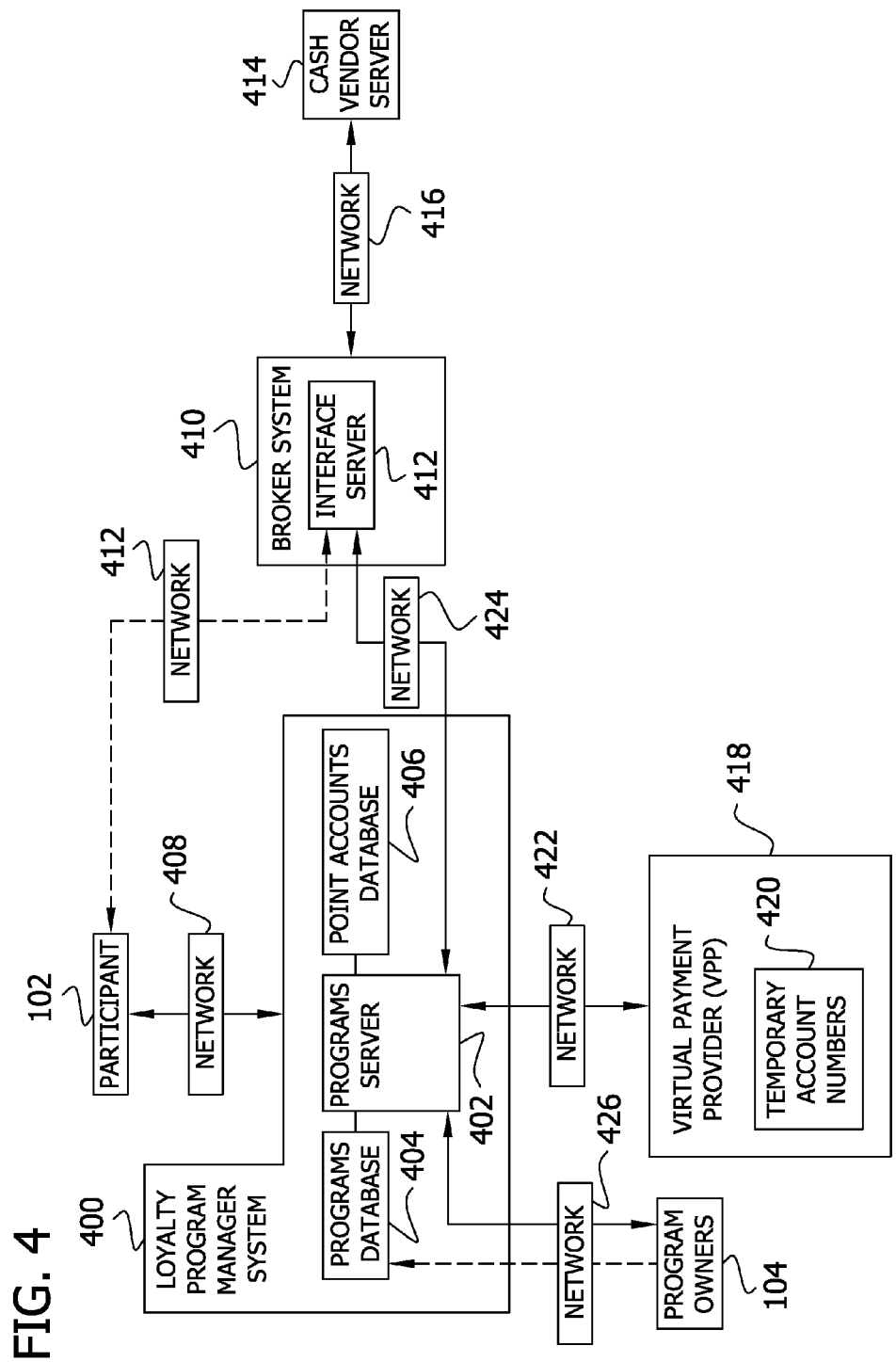

US 8,831,976 B2

SYSTEM AND METHOD FOR TRANSACTING PURCHASES WITH A CASH VENDOR USING POINTS AND A VIRTUAL CREDIT CARD

FIELD OF THE INVENTION

The present invention generally relates to a system and methods of payment in a points redemption transaction and, in particular, to a system and method that utilizes a participant's points and a virtual credit card account to implement a cash purchase with a cash vendor.

BACKGROUND OF THE INVENTION

Customer incentive programs, such as loyalty programs, issue points to customers (i.e., participants) as a reward for certain activities such as the purchase of certain products or services or performing a certain action. These points create a loyalty or affinity with the customer and encourage the customer to continue a desired behavior. The customer is motivated through some type of reward offering which allows the customer to redeem the points for rewards. The incentive programs are offered by program owners, who determine the eligibility and redemption rules for the programs. Program managers manage the incentive programs on behalf of a program owner and reconciling the amounts due from and to the parties and/or entities to the redemption transaction. The points needed to obtain the reward (e.g., the ticket) are deducted from the customer's point account upon redemption.

Automated systems for the redemption of points for rewards typically provide interfaces for the interaction between entities necessary to fulfill the reward request. Such entities may include a program owner, a program manager, redemption vendors, and a broker that acts as an intermediary between a participant and the redemption vendors. The customer selects a reward for purchase with the points and indicates the number of points to use towards the purchase of the particular product or service that has been selected. Existing systems such as disclosed in U.S. Pat. No. 7,143,087, the entire disclosure of which is incorporated herein by reference, typically utilize a single, hidden, large-balance credit card account held by the program manager to pay the vendor for the selected item or service, where the program manager thereafter reconciles the transaction and bills the appropriate parties.

However, since a single credit account is used, it is difficult to uniquely track a purchase or refund, e.g. two separate $500 redemption transactions for airline tickets by different participants occurring at the same time may be difficult to distinguish and/or independently track. The use of a single large-balance credit card may pose other challenges when purchases are modified or a refund is requested. For example, a participant redeems 1000 points for an airline ticket using an existing redemption system. After receiving the ticket, the participant calls the airline, requests changes on the ticket, and the airline charges the additional changes to the credit card used on the original purchase transaction. The program manager's large-balance credit card gets billed for the transaction and due to the difficulty in tracking the purchase (as noted above), it becomes a non-trivial task to reconcile the amount and bill the appropriate party.

There is an opportunity to eliminate the need for a single, hidden, large-balance credit account in the redemption of points, as well as an opportunity to provide for the easy reconciliation of amounts due to and from each party and/or entity to the points redemption transaction.

SUMMARY OF THE INVENTION

The invention addresses at least some of the above as well as other aspects by providing methods and systems for permitting a participant of a program of a program owner to transact a purchase using points with a cash vendor system which transacts purchases in currency. Any associated fees due to the cash vendor are paid for with points, by a participant credit card account, or both. In addition, any amounts not paid with points may be paid by the participant's credit card account. The invention also addresses the need to provide easy reconciliation by utilizing individual virtual credit card account ("vCC") numbers for each transaction, such that each vCC is uniquely associated with one redemption transaction.

In one form, the invention comprises a computerized method for use by a participant of a program of a program owner, in which the program awards points to the participant, where the awarded points are maintained in a point account for the participant by a program manager. The method permits the participant to transact a purchase using the awarded points with a cash vendor system which transacts purchases in currency. The transaction occurs via a broker website which interfaces between the participant and the cash vendor system. As part of the transaction, a virtual payment provider provides a vCC for facilitating the transaction. The method permits the participant to contact the cash vendor system via the broker website, and select from the cash vendor system via the broker website at least one item having a cash purchase price. The method further allows receiving, by the broker website, a participant credit card account ("pCC") for paying for fees and a nonpoint portion of the cash purchase price. The method additionally permits for requesting a vCC from the virtual payment provider ("VPP"), where the vCC is uniquely associated with the transaction. The method permits charging fees to the vCC, providing the vCC to the cash vendor system so that the cash vendor system can charge the cash purchase price to the vCC, charging the pCC for the nonpoint portion of the cash purchase price, and deducting points from the point account of the participant corresponding to the point portion of the cash purchase price. From the perspective of the participant, the participant uses the broker website to conduct a purchase transaction with the cash vendor system based in part on the points in the participant's point account and based in part on the participant's credit card account. From the perspective of the cash vendor system, the cash vendor system conducts the purchase transaction with the participant as a currency transaction based on the virtual credit card account.

In another form, the invention is a computerized method for use by a participant of a program of a program owner, in which the program awards points to the participant, with the awarded points maintained in a point account for the participant by a program manager. The method permits the participant to transact a purchase using the awarded points with a cash vendor system which transacts purchases in currency. The transaction occurs via a broker website which interfaces between the participant and the cash vendor system. As part of the transaction, a VPP provides a vCC for facilitating the transaction. The method permits the participant to contact the cash vendor system via the broker website and select from the cash vendor system via the broker website at least one item having a cash purchase price. The method further permits receiving, by the broker website, a pCC for paying for a nonpoint portion of the cash purchase price. The method additionally permits requesting a vCC from the VPP, where the vCC is uniquely associated with the transaction. The method permits providing the vCC to the cash vendor system so that the cash vendor system can charge the cash purchase price to the vCC, charging the pCC for the nonpoint portion of the cash purchase price, and deducting points from the point account of the participant corresponding to the points portion of the cash purchase price. From the perspective of the participant, the participant uses the broker website to conduct a purchase transaction with the cash vendor system based in part on the points in the participant's point account and based in part on the participant's credit card account. From the perspective of the cash vendor system, the cash vendor system conducts the purchase transaction with the participant as a currency transaction based on the vCC.

In another form, the invention is a computerized system for use by a participant of a program of a program owner, in which the program awards points to the participant, where the awarded points are maintained in a point account for the participant by a program manager. The system permits the participant to transact a purchase using the awarded points with a cash vendor system which transacts purchases in currency. The transaction occurs via a broker website which interfaces between the participant and the cash vendor system. As part of the transaction, a virtual payment provider provides a vCC for facilitating the transaction, the system comprising:

A participant graphical user interface (GUI) for permitting the participant to:
contact the cash vendor system via the broker website;
select from the cash vendor system via the broker website at least one item having a cash purchase price;
provide a participant credit card account for paying for a nonpoint portion of the cash purchase price;

A virtual payment provider server:
providing a vCC, wherein the vCC is uniquely associated with the transaction;

A program manager server:
requesting the vCC from the virtual payment provider;
charging the participant credit card account for the nonpoint portion of the cash purchase price;
deducting points from the point account of the participant corresponding to the points portion of the cash purchase price;

A broker server:
receiving the participant credit card account for paying for a nonpoint portion of the cash purchase price;
charging the cash purchase price of the item to the vCC;
providing the vCC to the cash vendor system so that the cash vendor system can charge the cash purchase price to the vCC.

From the perspective of the participant, the participant uses the broker website to conduct a purchase transaction with the cash vendor system based in part on the points in the participant's point account and based in part on the participant's credit card account. From the perspective of the cash vendor system, the cash vendor system conducts the purchase transaction with the participant as a currency transaction based on the virtual credit card account Other objects and features will be in part apparent and in part pointed out hereinafter.

BRIEF DESCRIPTION OF THE DRAWINGS

FIGS. 3A-3E are flow charts demonstrating aspects of the preferred embodiments of the methods of one embodiment of the invention.

FIG. 4 is an architecture overview of the system according to aspects of one embodiment of the invention.

Corresponding reference characters indicate corresponding parts throughout the drawings.

DESCRIPTION OF THE PREFERRED EMBODIMENTS

Figure 1:
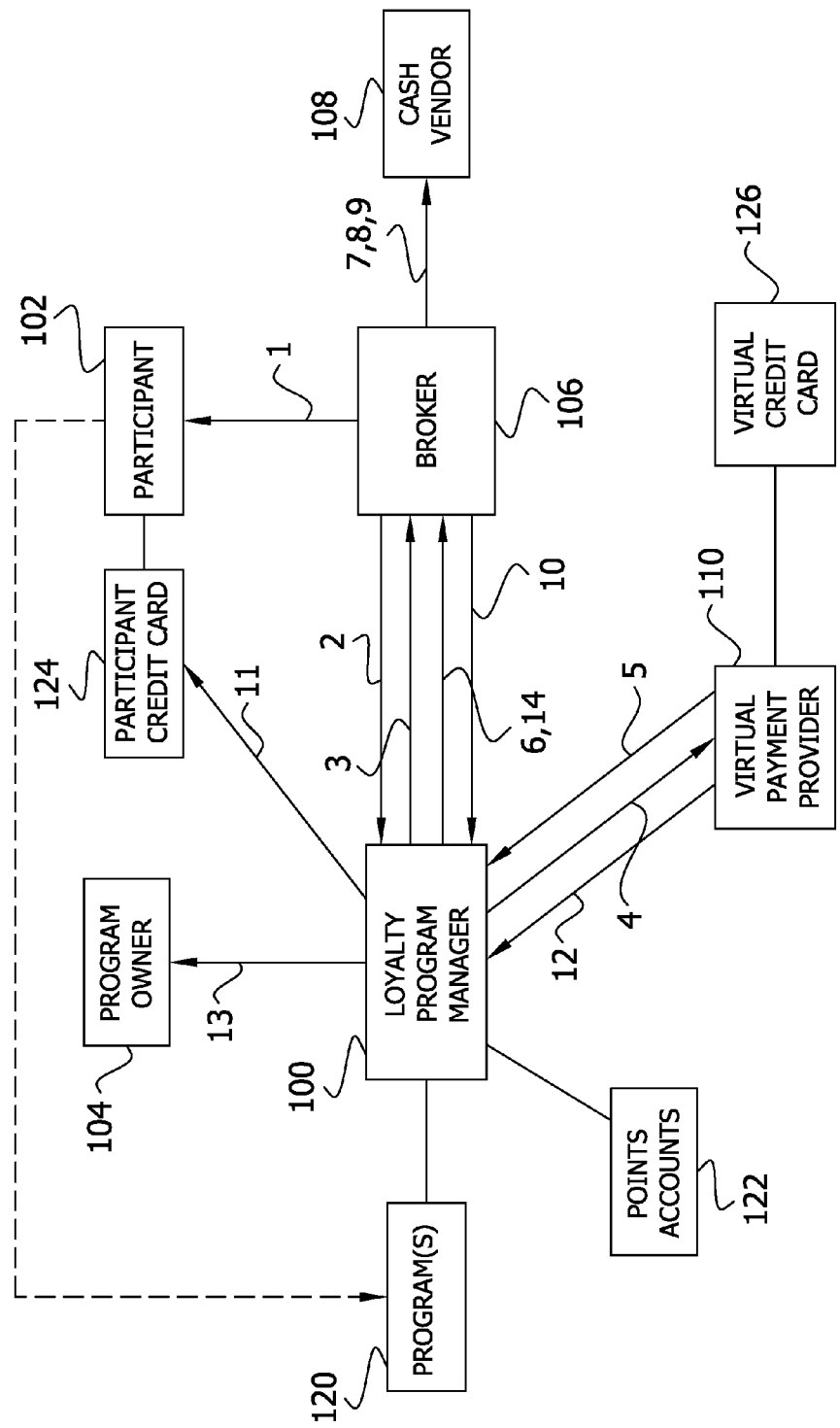
FIG. 1 is a flow diagram demonstrating aspects of the interaction between parties and entities to a points redemption transaction according to one embodiment of the invention.

FIG. 1 illustrates in block diagram form a system 100 according to one embodiment of the invention. A participant 102 is a member of a participant/customer points program for providing incentives or rewards or for encouraging a certain response, such as a frequency program. As an example, the participant 102 may be a member of a loyalty program 120 which includes individual participant accounts 122 indicating the number of points that a participant has been awarded or earned by the loyalty program. For example, the loyalty program may award participants for purchases of widgets from a particular vendor or group of vendors. For every dollar spent in purchasing a widget and completing a transaction, the participant would be awarded points which are added to the participant's point account 122.

The loyalty program 120 is associated with one or more program owners 104 and is operated by a program manager 100 for the benefit of the program owner 104. Usually, the program owner 104 pays a program manager 100 for the points redeemed by participant 102. In addition, the program owner 104 may pay to the program manager 100 administrative fees to administer the loyalty program 120. In one embodiment, the program manager 100 may manage several programs 120 for the program owner 104. In addition, the program manager 100 may manage programs 120 for other owners (not shown). In an alternative embodiment, the program manager 100 and the program owner 104 are the same entity.

From time-to-time, the participant 102 may use a communications link, such as an Internet connection, to communicate with a loyalty program manager 100 to access the loyalty program 120 and, in particular, to access the participant's program account 122 information. The participant 102 may communicate with the loyalty program manager 100 to redeem points in the participant's account 122, whereby the loyalty program manager 100 redirects the participant's communication to a broker 106. The broker 106 allows the participant 102 to redeem points for items or services that the broker 106 provides directly or that the broker 106 provides indirectly as an intermediary for one or more cash vendors 108 which transact business with cash or credit by not by points. Cash vendors 108 include, but are not limited to, service providers such as airline ticketing providers, rental car providers, and/or hotel providers, as well as product providers such as department stores, clothing vendor and/or other product vendors. Cash vendors 108 include any on-line vendor that transacts business by credit and/or debit cards.

Since cash vendors 108 do not transact business in points, there is a need for a structure to allow a participant 102 to affect a purchase from a cash vendor using the participant's points. In order to facilitate a points transaction with a cash vendor 108, a VPP 110 is included in the transaction. The VPP 110 provides a vCC 126 number for facilitating a transaction in which a participant 102 pays for the purchase of products or services from a cash vendor 108 with points. The use of the vCC account 126 is further described below.

Figure 2:
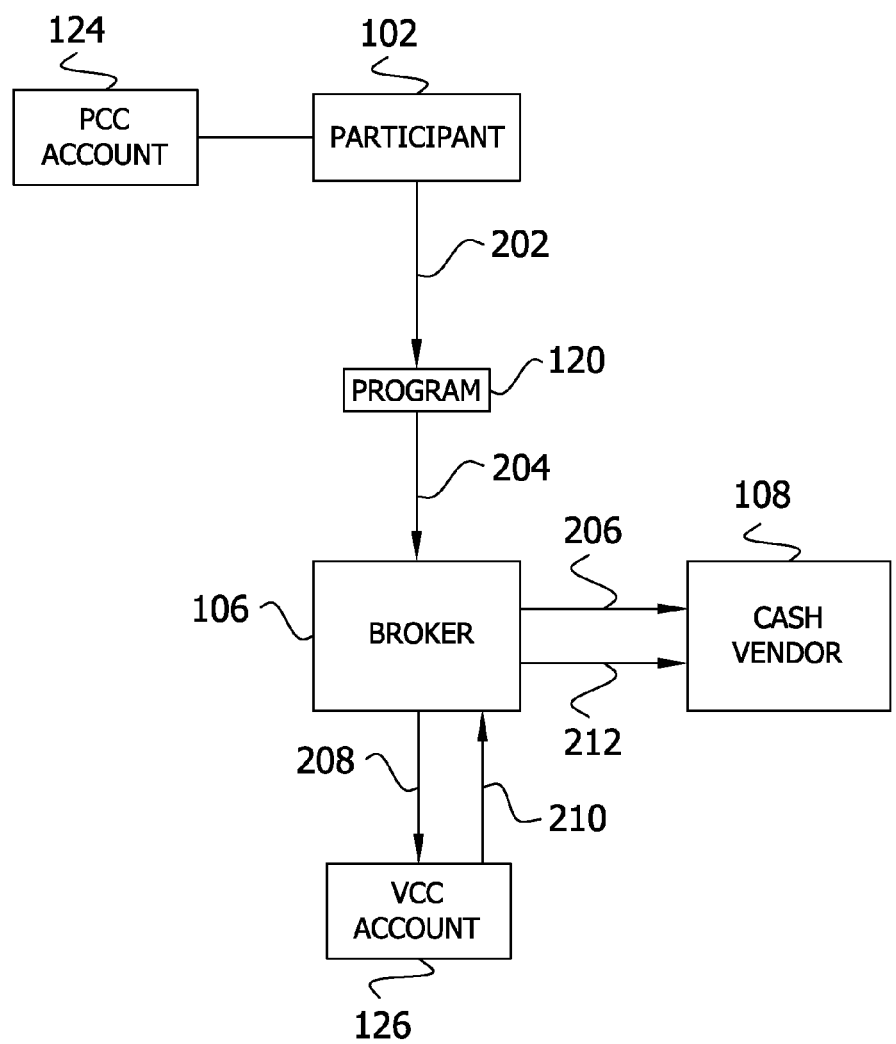
FIG. 2 is a flow diagram demonstrating aspects of the interaction between a participant and a broker during a points redemption transaction according to one embodiment of the invention.

FIG. 2 illustrates an embodiment of the system of FIG. 1, with certain communications between various entities demonstrated. In FIG. 2, the participant 102 accesses his/her program 120 at 202 to initiate a points redemption transaction with a cash vendor 108. The participant 102 is redirected at 204 to a website of the broker 106 which facilitates purchases with the cash vendor 108 via 206. As a specific example, the broker 106 may be a travel service such as Travelocity which facilitates purchases of tickets from airlines which do business in cash/credit.

In one form, the invention comprises a computerized system and method for use by the participant 102 of a program of a program owner (not shown in FIG. 2), in which the program awards points to the participant 102, where the awarded points are maintained in a point account for the participant by the program manager (not shown in FIG. 2). The system and method permit the participant 102 to transact a purchase using the awarded points with the cash vendor system 108 which transacts purchases in currency and not in points. The transaction occurs via the broker website 106 which interfaces between the participant 102 and the cash vendor system 108. As part of the transaction, a VPP (not shown in FIG. 2) provides the vCC 126 for facilitating the transaction. The system and method permit the participant 102 to contact the cash vendor system 108 (via 202, 204, 206) through the broker website 106, and select from the cash vendor system 108 via the broker website 106 at least one item having a cash purchase price. The system and method further allow receiving (via 202, 204), by the broker website, a participant credit card account (pCC 124) for paying for fees and a nonpoint portion of the cash purchase price. The system and method additionally permit the broker 106 to request (via 208) a vCC 126 from the VPP, where the vCC is uniquely associated with the transaction. The system and method permit charging fees to the vCC 126. The vCC 126 is provided to the cash vendor system 108 (via 210) so that the cash vendor system 108 can charge the cash purchase price to the vCC 126. The pCC 124 is charged by the broker 106 for the nonpoint portion of the cash purchase price, and points are deducted from the point account of the participant corresponding to the point portion of the cash purchase price. From the perspective of the participant 102, the participant uses the broker website 106 to conduct a purchase transaction with the cash vendor system 108 based in part on the points in the participant's point account and based in part on the participant's credit card account 124. From the perspective of the cash vendor system 108, the cash vendor system conducts the purchase transaction with the participant 102 as a cash/credit transaction based on the vCC 126.

The redemption of points by a participant 102 is further illustrated by the exemplary flowchart of FIGS. 3A-3E. The points program participant 102 selects an itinerary on a travel broker website 106 at step 302, utilizing a World Wide Web (WWW) browser or other suitable method or device that permits interaction with the travel broker 106 via a network. In one embodiment, the travel broker website 106 displays the participant's total number of points and the applicable conversion rate, e.g. 1000 points equals $100 towards a purchased travel item. Once the participant 102 has selected an appropriate itinerary, the participant elects to "checkout" and pay for the selected itinerary on the travel broker website, proceeding to step 304.

Once the participant 102 enters the checkout process, shown at 304, the participant 102 provides participant information, including but not limited to, participant's name, address, telephone number, and other information as needed or desired by the travel broker. Additionally, the participant 102 provides a pCC 124 during the checkout process. (FIG. 1, step 1). The pCC 124 is used to pay for any points redemption fee(s) and cash amounts not paid for using the participant's points.

The travel broker 106, at step 306, provides the pCC 124 to the program manager 100 for credit card authorization. (FIG. 1, step 2). The program manager 100 attempts to obtain authorization for the pCC 124. If authorization is denied, the itinerary purchase process is halted and the participant 102 is returned to step 304 to provide another pCC 124 for the transaction.

Once authorization has been obtained for the pCC 124 (FIG. 1, step 3), the program manager 100 requests and receives a vCC number 126 from a VPP 110 for the purchase at steps 310-312 (FIG. 1, steps 4-5). As noted previously, the vCC 126 is uniquely associated with the transaction.

In one embodiment, the vCC 126 is active for a single purchase only with an available credit equal to the total of the cash purchase price and fees. In this embodiment, the vCC may further be active for a limited period of time, for example, a two-hour period after the vCC has been made active. In this way, using a vCC avoids the challenges of independently tracking each purchase using a single, large-balance credit account and minimizes misuse of the vCC, such as by preventing further charges to a credit account after the redemption transaction has been completed. In a previous example, two separate $500 redemption transactions for airline tickets were described. By utilizing vCC accounts, these transactions can be independently tracked. According to the invention, each transaction is completed using a unique vCC account and therefore, regardless if the purchases occurred at the same time, each transaction reconciles back to its own vCC account.

The vCC can also prevent unauthorized, subsequent charges from being made after the redemption transaction. In an earlier example, the customer calls the airline directly to make additional changes to a purchased ticket and the airline charges the original credit card for the requested changes. Subsequent charges such as these can be prevented by utilizing a vCC that expires after a fixed period of time and/or limits the available credit to the total of the initial cash purchase price and fees. If the airline attempts to charge subsequent amounts to a vCC after it has expired and/or if the airline attempts to charge additional amounts to a vCC above the fixed available credit, such charges would be declined. The use of a vCC in the redemption transaction allows improved reconciliation through the unique association between the redemption transaction and the vCC used for the transaction. The unique vCC can be used as a tracking number for the transaction and for all reconciliation events subsequent to the transaction. Since each vCC is unique to each transaction, there is a one-to-one correspondence between the vCC account and the transaction. Thus, a search of multiple transactions using the vCC will identify the one and only transaction for which the vCC is used.

The program manager 100 transmits the vCC 126 to the travel broker website 106 via the network at 314 (FIG. 1, step 6). The travel broker 106 charges the appropriate points redemption fees to the vCC 126 at 316. Such fees may include, but are not limited to, fees due the travel broker, fees due the program manager, or fees due the program owner. The travel broker 106 thereafter transmits the vCC 126 to the cash vendor system 108 at step 318, for example, an airline ticketing system. Once received, the cash vendor system 108 charges at 320 the vCC 126 for the total airfare amount in the participant selected itinerary (FIG. 1, steps 7-9 for the charging of amounts to the vCC).

After the cash vendor system 108 has charged the vCC 126 for the total airfare amount, two charges will appear (at 321) on the vCC statement: 1) the fees charged by the travel broker, and 2) the amount charged for the airfare by the airline vendor system. As indicated above, the vCC 126 may be issued with a balance limit, in which case the total of the charges applied to the vCC 126 are not to exceed the balance limit.

The travel broker 106 notifies the program manager 100, at 322, of the cash amount to be charged to the pCC 124 (FIG. 1, step 10). The program manager charges the pCC 124 for fees and airfare not paid with the participant's available points (FIG. 1, step 11).

At step 324, the program manager 100 charges the pCC 124 for fees and airfare not paid for with participant loyalty points. In this embodiment, the fee amount includes amounts due the broker 106 and program manager 100.

At step 326, the VPP 110 receives payment from the program manager for the fees and airfare charged to the vCC 126 (FIG. 1, step 12).

At step 328, the program manager 100 receives payment from the program owner 104 for the amount of the airfare paid with loyalty program points (FIG. 1, step 13).

The program manager 100 receives payment from the travel broker 106 at 330 for program manager fees and other service fees charged to the vCC 126 by the travel broker 106 (FIG. 1, step 14).

At the conclusion of the transaction, the points redeemed for the airline ticket have been deducted from participant's points account balance and the points credited to the program owner at the time of payment at step 328. An exemplary financial settlement of the above described transaction is demonstrated in Table 1:

The STEP column numbers of Table 1 correspond to the step numbers indicated in FIGS. 1 and 2. The following is a summary of Table 1: At step 1, the participant receives tickets (see row/column 1B) which are supplied by the airline (1C). At step 7, the travel broker receives program manager and travel broker fees (7E) charged to the vCC (7D). At step 9, the airline receives the cash value of points and cash tickets (9C) charged to the vCC (9D). At step 11, the program manager receives the cash amount for the ticket or ticket portion paid with cash and receives the fees (11F), which cash and fees are charged to the pCC (11A). Additionally at step 11, the points used in the transaction are removed from the participant's point account (11B) and temporarily provided to the program manager (11F). At step 12, the VPP receives payment for the amounts charged to the vCC during the transaction (D12) from the program manager (F12). At step 13, the program manager receives payment (F13) from the program owner (G13) for the cash value of the points used in the transaction. Additionally at step 13, the points used in the transaction are returned to the program owner (G13) by the program manager (F13). At step 14, the travel manager receives the travel manager portion of the fees (F14) from the travel broker (E14). At the conclusion of the transaction, the following is the end result: The pCC has been charged for the ticket or portion of a ticket paid in cash and the program manager and travel broker fees (Totals, column A). The participant has received ticket(s), and the points used in the transactions have been deducted from the participant's points account (Totals, column B). The airline has supplied the tickets and received payment for the tickets (Totals, column C). The vCC has a zero balance (Totals, column D). The travel broker and the program manager have received their portion of the fees (Totals, column E and F respectively), and the program owner has paid for and received back the points used in the transaction (Totals, column G).

TABLE 1

Participant pays fees which go to the travel broker and to the program manager

| STEP | A pCC | B Participant | C Airline | D vCC | E Travel Broker | F Program Manager | G Program Owner |
|---|---|---|---|---|---|---|---|
| 1 | | +a/f(p)tix<br>+a/f(c)tix | −a/f(p)tix<br>−a/f(c)tix | | | | |
| 7 | | | | −fees(M + T) | +fees(M + T) | | |
| 9 | | | +a/f$(p)<br>+a/f$(c) | −a/f$(p)<br>−a/f$(c) | | | |
| 11 | −a/f$(c)<br>−fees(M + T) | −points | | | | +fees(M + T)<br>+a/f$(c)<br>+points | |
| 12 | | | | +fees(M + T)<br>+a/f$(p)<br>+a/f$(c) | | −fees(M + T)<br>−a/f$(p)<br>−a/f$(c) | |
| 13 | | | | | | +a/f$(p)<br>−points | −a/f$(p)<br>+points |
| 14 | | | | | −fees(M) | +fees(M) | |
| Totals | −a/f$(c)<br>−fees(M + T) | +a/f(p)tix<br>+a/f(c)tix<br>−points | −a/f(p)tix<br>−a/f(c)tix<br>+a/f$(p)<br>+a/f$(c) | 0 | +fees(T) | +fees(M) | −a/f$(p)<br>+points |

+a/f(p)tix = ticket (or ticket portion) paid with points
+a/f(c)tix = ticket (or ticket portion) paid with cash
points = points in Participant's account
CASH AMOUNTS:
fees(M + T) = manager (M) and travel broker (T) cash fees
a/f$(p) = cash value of points ticket
a/f$(c) = cash value of cash ticket
− means charged or supplied
+ means received In another embodiment, the program owner 104 pays the fees associated with the points redemption transaction. In this embodiment, the pCC 124 is charged at 360 for any cash amount of the airline ticket not paid for with points, but the pCC 124 is not charged for fees. Rather, the program manager 100 receives payment at 364 from the program owner 104 for the amount of the airfare paid with loyalty points and payment for fees associated with the transaction. An exemplary financial settlement of a transaction in this embodiment is demonstrated in Table 2:

TABLE 2

Program Owner pays fees which go to the travel broker and to the program manager

| STEP | A pCC | B Participant | C Airline | D vCC | E Travel Broker | F Program Manager | G Program Owner |
|---|---|---|---|---|---|---|---|
| 1 | | +a/f(p)-tix +a/f(c)-tix | −a/f(p)-tix −a/f(c)-tix | | | | |
| 7 | | | | −fees(M + T) | +fees(M + T) | | |
| 9 | | | +a/f$(p) +a/f$(c) | −a/f$(p) −a/f$(c) | | | |
| 11 | −a/f$(c) | −points | | | | +a/f$(c) +points | |
| 12 | | | | +fees(M + T) +a/f$(p) +a/f$(c) | | −fees(M + T) −a/f$(p) −a/f$(c) | |
| 13 | | | | | | +a/f$(p) +fees(M + T) −points | −a/f$(p) −fees(M + T) +points |
| 14 | | | | | −fees(M) | +fees(M) | |
| Totals | −a/f$(c) | +a/f(p)-tix +a/f(c)-tix −points | −a/f(p)-tix −a/f(c)-tix +a/f$(p) +a/f$(c) | 0 | +fees(T) | +fees(M) | −a/f$(p) −fees(M + T) +points |

+a/f(p)-tix = ticket (or ticket portion) with points
+a/f(c)-tix = ticket (or ticket portion) with cash
points = points in Participant's account
CASH AMOUNTS:
fees(M + T) = manager (M) and travel broker (T) cash fees
a/f $(p) = cash value of points ticket
a/f $(c) = cash value of cash ticket
− means charged or supplied
+ means received The STEP column numbers of Table 2 correspond to the element numbers indicated in FIGS. 1 and 2. The following is a summary of Table 2: At step 1, the participant receives tickets (see row/column 1B) which are supplied by the airline (1C). At step 7, the travel broker receives program manager and travel broker fees (7E) charged to the vCC (7D). At step 9, the airline receives the cash value of points and cash tickets (9C) charged to the vCC (9D). At step 11, the program manager receives the cash amount for the ticket or ticket portion paid with cash (11F), which cash is charged to the pCC (11A). Additionally at step 11, the points used in the transaction are removed from the participant's point account (11B) and temporarily provided to the program manager (11F). At step 12, the VPP receives payment for the amounts charged to the vCC during the transaction (D12) from the program manager (F12). At step 13, the program manager receives payment (F13) from the program owner (G13) for the cash value of the points used in the transaction and the fees charged to the vCC. Additionally at step 13, the points used in the transaction are returned to the program owner (G13) by the program manager (F13). At step 14, the travel manager receives the travel manager portion of the fees (F14) from the travel broker (E14). At the conclusion of the transaction, the following is the end result: The pCC has been charged for the ticket or portion of a ticket paid in cash (Totals, column A). The participant has received ticket(s), and the points used in the transactions have been deducted from the participant's points account (Totals, column B). The airline has supplied the tickets and received payment for the tickets (Totals, column C). The vCC has a zero balance (Totals, column D). The travel broker and the program manager have received their portion of the fees (Totals, column E and F respectively), and the program owner has paid for the transaction fees and paid for and received back the points used in the transaction (Totals, column G).

In another embodiment, the participant pays fees associated with the points redemption transaction. In this embodiment, the pCC 124 is charged at step 324 for fees and airfare not paid with loyalty points. The fee amount includes a fee due the broker 106, the program manager 100, and the program owner 104 for the points redemption transaction. The program manager 100 credits the program owner 104 for the program owner fee and the program owner 104 receives payment of the program owner fee at step 324, at which time the program manager 100 receives payment from the program owner 104 for the amount paid with participant loyalty points. An exemplary financial settlement of a transaction in this embodiment is demonstrated in Table 3:

TABLE 3

Participant pays fees which go to the travel broker, the program manager and to the program owner

| STEP | A<br>pCC | B<br>Participant | C<br>Airline | D<br>vCC | E<br>Travel Broker | F<br>Program Manager | G<br>Program Owner |
|---|---|---|---|---|---|---|---|
| 1 | | +a/f(p)-tix<br>+a/f(c)-tix | −a/f(p)-tix<br>−a/f(c)-tix | | | | |
| 7 | | | | −fees(M + T + O) | +fees(M + T + O) | | |
| 9 | | | +a/f$(p)<br>+a/f$(c) | −a/f$(p)<br>−a/f$(c) | | | |
| 11 | −a/f$(c)<br>−fees(M + T + O) | −points | | | | +fees(M + T + O)<br>+a/f$(c)<br>+points | |
| 12 | | | | +fees(M + T + O)<br>+a/f$(p)<br>+a/f$(c) | | − fees(M + T + O)<br>−a/f$(p)<br>−a/f$(c) | |
| 13 | | | | | | +a/f$(p)<br>−fees(O)<br>−points | −a/f$(p)<br>+fees(O)<br>+points |
| 14 | | | | | −fees(M + O) | +fees(M + O) | |
| Totals | −a/f$(c)<br>−fees(M + T + O) | +a/f(p)-tix<br>+a/f(c)-tix<br>−points | −a/f(p)-tix<br>−a/f(c)-tix<br>+a/f$(p)<br>+a/f$(c) | 0 | +fees(T) | +fees(M) | −a/f$(p)<br>+fees(O)<br>+points |

+a/f(p)-tix = ticket (or ticket portion) with points
+a/f(c)-tix = ticket (or ticket portion) with cash
points = points in Participant's account
CASH AMOUNTS:
fees(M + T + O) = manager (M), travel broker (T), and program owner (O) cash fees
a/f$(p) = cash value of points ticket
a/f$(c) = cash value of cash ticket
− means charged or supplied
+ means received The STEP column numbers of Table 3 correspond to the element numbers indicated in FIGS. 1 and 2. The following is a summary of Table 3: At step 1, the participant receives tickets (see row/column 1B) which are supplied by the airline (1C). At step 7, the travel broker receives program manager, travel broker, and program owner fees (7E) charged to the vCC (7D). At step 9, the airline receives the cash value of points and cash tickets (9C) charged to the vCC (9D). At step 11, the program manager receives the cash amount for the ticket or ticket portion paid with cash and receives the fees (11F), which cash and fees are charged to the pCC (11A). Additionally at step 11, the points used in the transaction are removed from the participant's point account (11B) and temporarily provided to the program manager (11F). At step 12, the VPP receives payment for the amounts charged to the vCC during the transaction (D12) from the program manager (F12). At step 13, the program manager receives payment (F13) from the program owner (G13) for the cash value of the points used in the transaction, and the program owner receives payment from the program manager for the program owner fees (G13). Additionally at step 13, the points used in the transaction are returned to the program owner (G13) by the program manager (F13). At step 14, the travel manager receives the travel manager portion of the fees (F14) from the travel broker (E14). At the conclusion of the transaction, the following is the end result: The pCC has been charged for the ticket or portion of a ticket paid in cash and the program manager, travel broker, and program owner fees (Totals, column A). The participant has received ticket(s), and the points used in the transactions have been deducted from the participant's points account (Totals, column B). The airline has supplied the tickets and received payment for the tickets (Totals, column C). The vCC has a zero balance (Totals, column D). The travel broker, program manager, and program owner have each received their portion of the fees (Totals, column E, F, and G respectively), and the program owner has paid for and received back the points used in the transaction (Totals, column G).

In FIGS. 1, 2 and 4, components of the system and method of the invention have been generally referred to as a broker and cash vendor. In the remaining FIGS. 3A to 3E, a specific example is illustrated wherein the broker is a travel broker and the vendor is an airline.

Figure 3A:
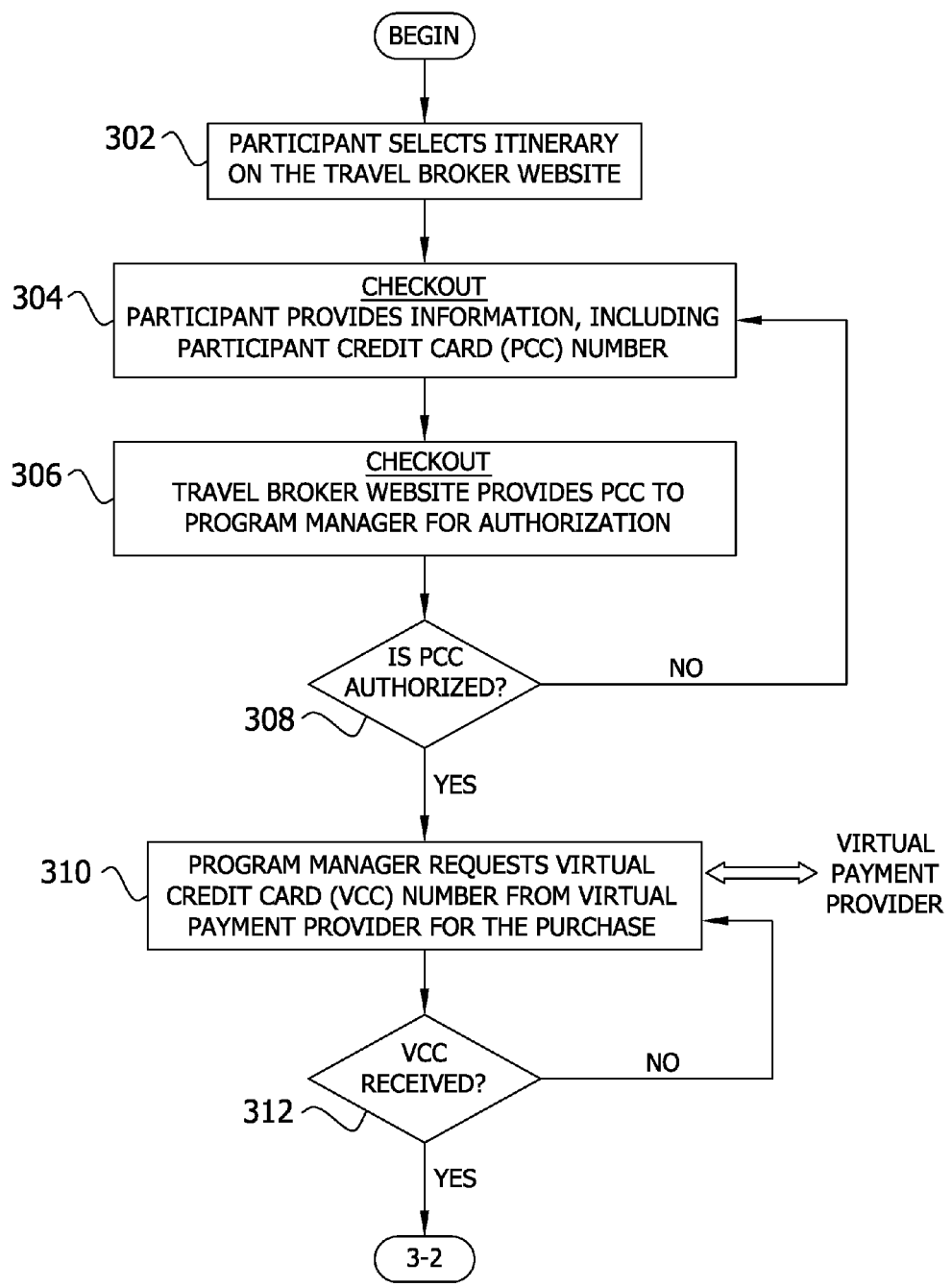
Figure 3B:
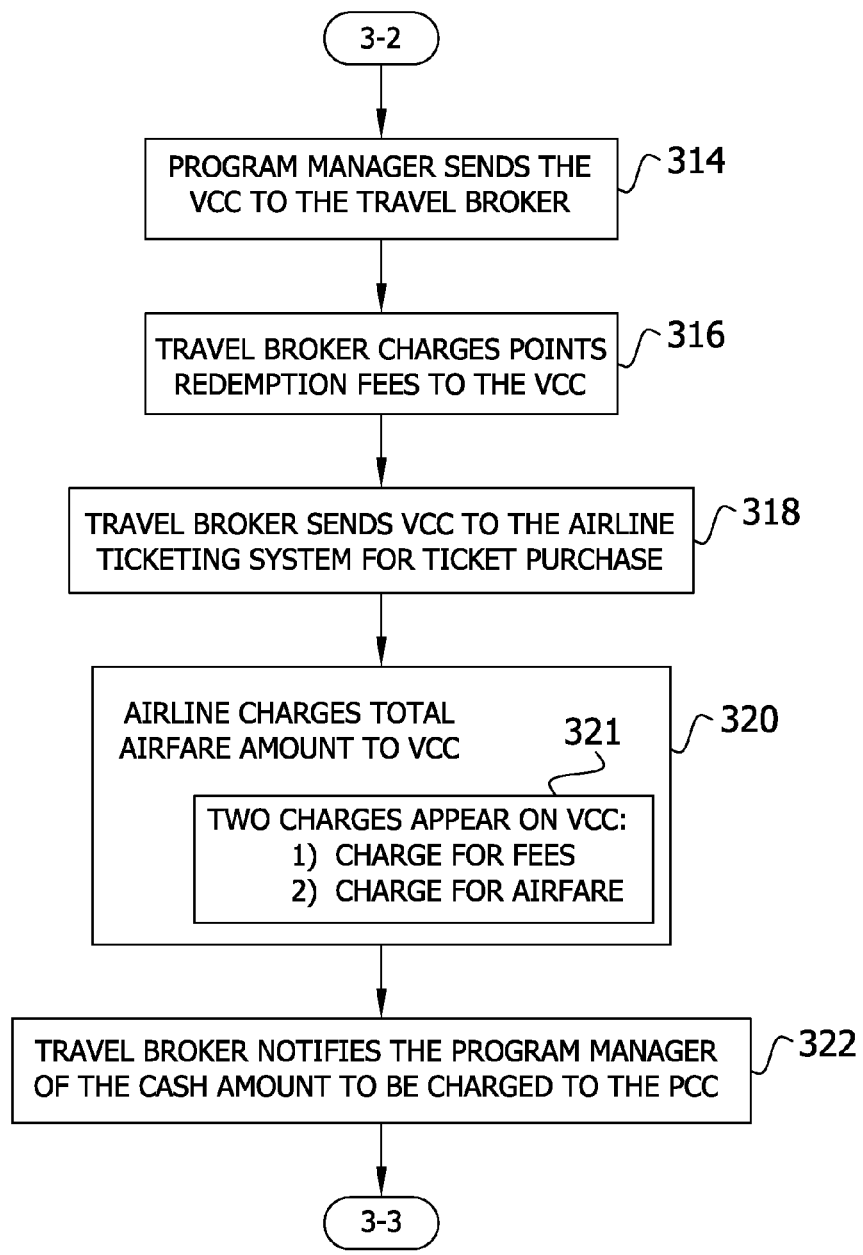
Figure 3C:
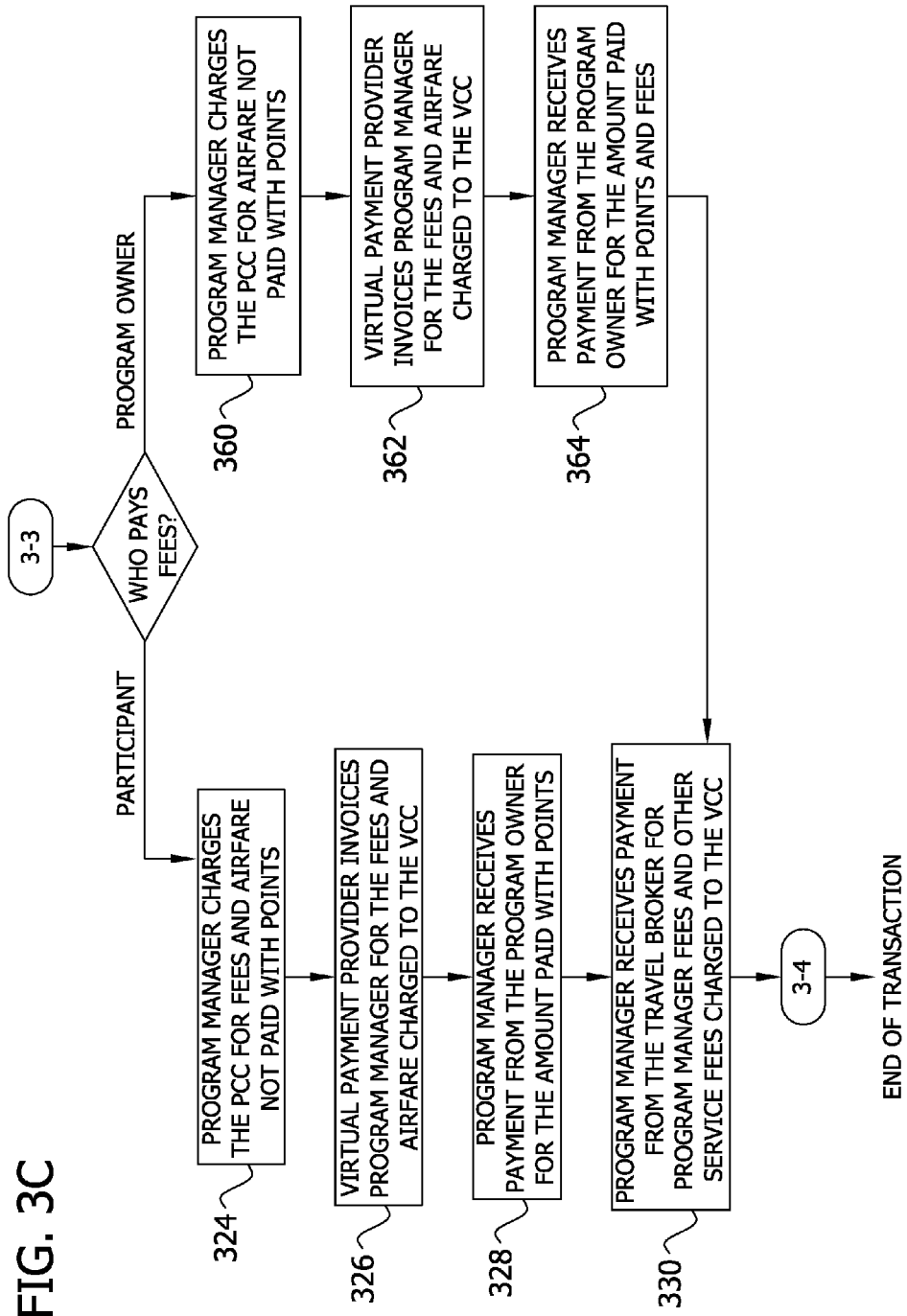
Figure 3D:
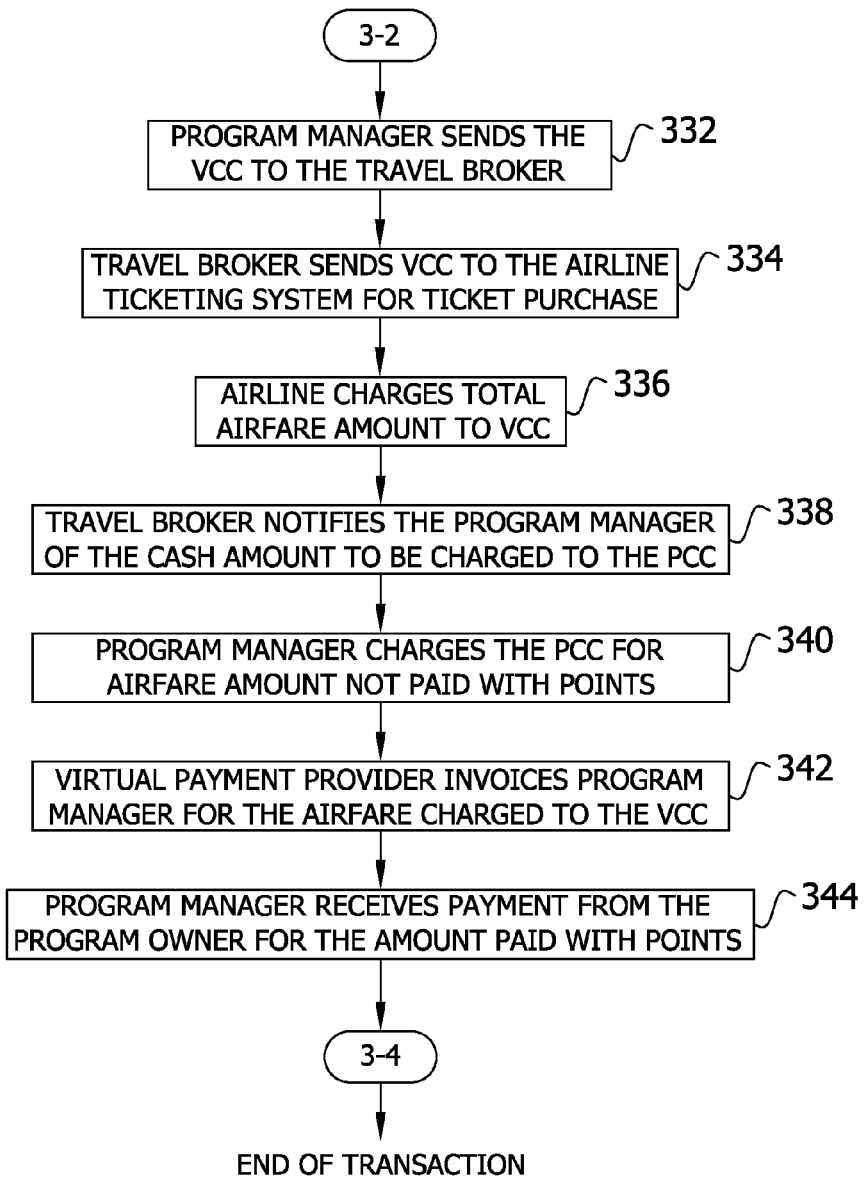

In another embodiment of the present invention, no fees are charged for the redemption of points. The checkout process proceeds as shown in steps 302-312 of FIG. 3A. If no fees are charged or incurred during the transaction, the process continues as shown in FIG. 3D. The program manager 100 transmits the vCC 126 to the travel broker 106 via the network at 332. The travel broker 106 thereafter transmits the vCC 126 to the cash vendor system 108 at step 334, for example, an airline ticketing system. Once received, the cash vendor system 108 charges the vCC 126 for the total airfare amount in the participant selected itinerary.

At step 336, the cash vendor system 108 charges the vCC 126 for the total airfare amount. As indicated above, the vCC 126 is issued with a balance limit, and the total of the charges applied to the vCC 126 are not to exceed the balance limit.

The travel broker 106 notifies the program manager 100, at 338, of the cash amount to be charged to the pCC 124. The program manager 100 charges the pCC 124 for airfare not paid with the participant's available points. At step 340, the program manager 100 charges the pCC 124 for airfare not paid for with participant loyalty points. At step 342, the VPP 110 receives payment from the program manager 100 for the airfare charged to the vCC.

At step 344, the program manager 100 receives payment from the program owner 104 for the amount of the airfare paid with loyalty program points.

Alternately, the program owner 104 could pay a recurring fee, such as a monthly fee, to the program manager 100, the broker 106, or both, wherein the recurring fee is paid independent of any points redemption transactions.

At the conclusion of the transaction, the points redeemed for the airline ticket have been deducted from participant's points account 112 balance and the points credited to the program owner 104 at the time of payment at step 328. An exemplary financial settlement of a transaction in this embodiment is demonstrated in Table 4:

TABLE 4

No fees are paid during the transaction

| STEP | A pCC | B Participant | C Airline | D vCC | E Travel Broker | F Program Manager | G Program Owner |
|---|---|---|---|---|---|---|---|
| 1 | | +a/f(p)-tix +a/f(c)-tix | −a/f(p)-tix −a/f(c)-tix | | | | |
| 7 | | | | | | | |
| 9 | | | +a/f$(p) +a/f$(c) | −a/f$(p) −a/f$(c) | | | |
| 11 | −a/f$(c) | −points | | | | +a/f$(c) +points | |
| 12 | | | | +a/f$(p) +a/f$(c) | | −a/f$(p) −a/f$(c) | |
| 13 | | | | | | +a/f$(p) −points | −a/f$(p) +points |
| 14 | | | | | | | |
| Totals | −a/f$(c) | +a/f(p)-tix +a/f(c)-tix −points | −a/f(p)-tix −a/f(c)-tix +a/f$(p) +a/f$(c) | 0 | 0 | 0 | −a/f$(p) +points |

+a/f(p)-tix = ticket (or ticket portion) with points
+a/f(c)-tix = ticket (or ticket portion) with cash
points = points in Participant's account
CASH AMOUNTS:
a/f$(p) = cash value of points ticket
a/f$(c) = cash value of cash ticket
− means charged or supplied
+ means received The STEP column numbers of Table 4 correspond to the element numbers indicated in FIGS. 1 and 2. The following is a summary of Table 4: At step 1, the participant receives tickets (see row/column 1B) which are supplied by the airline (1C). At step 9, the airline receives the cash value of points and cash tickets (9C) charged to the vCC (9D). At step 11, the program manager receives the cash amount for the ticket or ticket portion paid with cash (11F), which cash is charged to the pCC (11A). Additionally at step 11, the points used in the transaction are removed from the participant's point account (11B) and temporarily provided to the program manager (11F). At step 12, the VPP receives payment for the amounts charged to the vCC during the transaction (D12) from the program manager (F12). At step 13, the program manager receives payment (F13) from the program owner (G13) for the cash value of the points used in the transaction. Additionally at step 13, the points used in the transaction are returned to the program owner (G13) by the program manager (F13). At the conclusion of the transaction, the following is the end result: The pCC has been charged for the ticket or portion of a ticket paid in cash (Totals, column A). The participant has received ticket(s), and the points used in the transactions have been deducted from the participant's points account (Totals, column B). The airline has supplied the tickets and received payment for the tickets (Totals, column C). The vCC has a zero balance (Totals, column D). The travel broker and the program manager have zero balances as well (Totals, column E and F respectively), and the program owner has paid for and received back the points used in the transaction (Totals, column G).

It should be understood that Tables 1-4 are intended to demonstrate the net effect of transaction settlement between the parties shown, wherein each row may represent one or more transactions between the parties.

Cancellation of a Refundable Ticket—

FIG. 3E illustrates an exemplary participant request to cancel a purchased airline ticket. At step 380, a participant 102 requests cancellation of an airline ticket through the travel broker 106. If the ticket is refundable, the cash vendor system 108 cancels the reservation at step 382 and the travel broker 106 notifies the participant 102 of the cancellation at step 384. The cash vendor system 108 issues credit at 386 for the ticket amount to the vCC 126 used for the transaction.

At step 388, the VPP 110 issues credit to the program manager 100 for the credit received from the vendor system 108 due to the cancellation.

The program manager 100 issues credit to the pCC 124, at step 390, for any airfare charged to the pCC 124. Generally, any fees charged during the initial points redemption process are not refundable. The program manager 100 issues credit to the program owner 104 for the amount charged for the points used in the initial points redemption transaction.

While the above described steps are described using sequential ordering, it should be understood that some of the illustrative steps in FIGS. 3A-3E can be performed in parallel and/or simultaneously without departing from the scope of the present invention. FIGS. 3A-3E illustrate an exemplary embodiment of some, but not all, aspects of the claimed invention.

Referring to FIG. 4, a diagram of the architecture of one embodiment of the system according to the invention is illustrated. A loyalty program manager system 400 includes a loyalty program server 402, a loyalty program database 404, which includes information relating to the loyalty programs, and a loyalty points accounts database 406, which includes the listing of the accounts of the participants. Program owners 104 are associated with the programs in the loyalty programs database through the program server 402. A participant 102 interfacing with the loyalty program manager system 400 via the communication pathway 408. A participant 308, seeking to redeem points, is redirected to the broker system 410, via the communication pathway 412.

In FIG. 4, the architecture further illustrates an interface server 412 of the broker system 410 interfacing with a cash vendor system 414, via the communication pathway 416, for providing cash vendor items to a participant. The architecture additionally illustrates a virtual payment provider ("VPP") 418 interfacing with the program server 402 of the loyalty program manager system 400, wherein the VPP is capable of providing a vCC to the program server 402 for use in a point redemption transaction.

Having described the invention in detail, it will be apparent that modifications and variations are possible without departing from the scope of the invention defined in the appended claims.

It will be appreciated that the network connections and data communications shown in the Figures and described herein are exemplary and other means of establishing a communications link between the computers and communicated data therebetween may be used without departing from the scope of the invention. Such networks may include, but are not limited to, local area networks, wide area networks, intranets, ad-hoc networks, and the Internet. Such means of communicating data may include, but are not limited to, API calls, web services, RPC, CORBA, and other transport mechanisms and technology.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above methods and system without departing from the scope of the invention, it is intended that all matter contained in the above description and shown in the accompanying drawing[s] shall be interpreted as illustrative and not in a limiting sense.

What is claimed is:

1. A computerized system for use by a participant of a program which awards points to the participant, wherein the awarded points are maintained in a point account for the participant by a program manager server, said system for permitting the participant to transact a single purchase of an item having a cash purchase price using the awarded points with a cash vendor system which transacts purchases in currency, said system comprising:
   a participant graphical user interface (GUI) component;
   a virtual payment provider server;
   a program manager server;
   a broker system;
   said broker system including a memory device containing instructions that when executed by the broker system performs the steps of:
      conducting the single purchase by the participant GUI component from the cash vendor by linking the participant GUI component and the cash vendor system;
      facilitating payment to the cash vendor system by linking the program manager server and the cash vendor system; and
      facilitating payment to the program manager server by linking the participant GUI component and the program manager server;
   said participant GUI component responsive to the participant's input and including a memory device containing instructions that when executed by the GUI component performs the steps of:
      selecting from the cash vendor system via the broker system at least one item having a cash purchase price; and
      providing to the program manager server via the broker system a participant credit card account;
   said virtual payment provider server including a memory device containing instructions that when executed by virtual payment provider server performs the step of:
      providing a virtual credit card account to the program manager server in response to a request from the program manager server, wherein the virtual credit card account is uniquely associated with only the single purchase, wherein the virtual credit card account is active for the single purchase only and wherein the virtual credit card account has available credit equal to a total cash amount for the single purchase;
   said program manager server including a memory device containing instructions that when executed by program manager server performs the steps of:
      requesting the virtual credit card account from the virtual payment provider server wherein the program manager server pays the cash purchase price to the virtual credit card account;
      charging the participant credit card account for the non-point amount of the single purchase to be paid to the program manager server; and
      deducting from the point account of the participant points corresponding to the points amount of the single purchase;
   the memory device of said broker system containing instructions that when executed by broker system performs the step of:
      providing the virtual credit card account to the cash vendor system so that the cash vendor system charges only the cash purchase price to the virtual credit card account;
   wherein, from the perspective of the participant, the participant GUI component is configured to interface with the broker system to conduct the single purchase with the cash vendor system based in part on the points in the participant's point account and based in part on the participant's credit card account; and
   wherein, from the perspective of the cash vendor system, the cash vendor system conducts the single purchase with the participant as a currency transaction based on the virtual credit card account.

2. The system of claim 1 wherein the program manager server is configured to charge the broker fees to the participant credit card account to be paid via the program manager server to the broker system.

3. The system of claim 1 wherein the program manager server is configured to charge the program manager fees to the participant credit card account to be paid to the program manager server.

4. A computerized method for use by a participant of a program which awards points to the participant, wherein the awarded points are maintained in a point account for the participant by a program manager server, said system for permitting the participant to transact a single purchase of an item having a cash purchase price using the awarded points with a cash vendor system which transacts purchases in currency, said computerized method comprising processor instructions stored in a tangible medium and executed by the processor, said computerized method comprising:

conducting by the processor, the single purchase by the participant GUI from the cash vendor by linking the participant GUI component and the cash vendor system;

facilitating by the processor, payment to the cash vendor system by linking the program manager server and the cash vendor system; and facilitating, by the processor, payment to the program manager server by linking the participant GUI component and the program manager server;

said participant GUI component:

selecting from the cash vendor system via a broker system at least one item having a cash purchase price; and providing to the program manager server via the broker system a participant credit card account;

a virtual payment provider server:

providing a virtual credit card account to the program manager server in response to a request from the program manager server, wherein the virtual credit card account is uniquely associated with only the single purchase, wherein the virtual credit card account is active for the single purchase only and wherein the virtual credit card account has available credit equal to a total cash amount for the single purchase;

the program manager server:

requesting, by a processor, the virtual credit card account from the virtual payment provider server wherein the program manager server pays the cash purchase price to the virtual credit card account;

charging the participant credit card account for the non-point amount of the single purchase to be paid to the program manager server; and deducting from the point account of the participant points corresponding to the points amount of the single purchase;

the broker system:

providing, by a processor, the virtual credit card account to the cash vendor system so that the cash vendor system charges only the cash purchase price to the virtual credit card account;

wherein, from the perspective of the participant, the participant GUI component is configured to interface with the broker system to conduct the single purchase with the cash vendor system based in part on the points in the participant's point account and based in part on the participant's credit card account; and wherein, from the perspective of the cash vendor system, the cash vendor system conducts the single purchase with the participant as a currency transaction based on the virtual credit card account.

5. The method of claim 4 wherein the instructions executable by the program manager server are configured to charge the broker fees to the participant credit card account to be paid via the program manager server to the broker system.

6. The method of claim 4 wherein the instructions executable by the program manager server are configured to charge the program manager fees to the participant credit card account to be paid to the program manager server.

\* \* \* \* \*